(12) United States Patent
Hollingsworth

(10) Patent No.: US 8,286,177 B2
(45) Date of Patent: Oct. 9, 2012

(54) TECHNIQUE FOR CONSERVING SOFTWARE APPLICATION RESOURCES

(75) Inventor: John Matt Hollingsworth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 12/361,545

(22) Filed: Jan. 29, 2009

(65) Prior Publication Data

US 2010/0192156 A1  Jul. 29, 2010

(51) Int. Cl.
*G06F 9/46* (2006.01)
(52) U.S. Cl. ........................................ 718/104; 718/105
(58) Field of Classification Search .................... None
See application file for complete search history.

(56) References Cited

U.S. PATENT DOCUMENTS

| | | | |
|---|---|---|---|
| 5,745,652 A | 4/1998 | Bigus | |
| 6,154,787 A | 11/2000 | Urevig et al. | |
| 6,219,728 B1 * | 4/2001 | Yin | 710/52 |
| 6,577,597 B1 | 6/2003 | Natarajan et al. | |
| 6,721,812 B1 * | 4/2004 | Scott et al. | 710/5 |
| 6,768,901 B1 | 7/2004 | Osborn et al. | |
| 6,816,905 B1 | 11/2004 | Sheets et al. | |
| 7,143,222 B2 * | 11/2006 | Fisher et al. | 710/200 |
| 7,203,746 B1 | 4/2007 | Harrop | |
| 7,395,537 B1 * | 7/2008 | Brown et al. | 718/104 |
| 7,565,656 B2 * | 7/2009 | Yamasaki et al. | 718/104 |
| 7,693,995 B2 * | 4/2010 | Kudo et al. | 709/226 |
| 8,041,796 B2 * | 10/2011 | Presley | 709/223 |
| 2006/0025950 A1 * | 2/2006 | Childress et al. | 702/92 |
| 2007/0250837 A1 * | 10/2007 | Herington et al. | 718/105 |
| 2008/0195450 A1 * | 8/2008 | Cho | 705/8 |
| 2009/0119673 A1 * | 5/2009 | Bubba | 718/104 |
| 2009/0183168 A1 * | 7/2009 | Uchida | 718/104 |
| 2009/0262691 A1 * | 10/2009 | Lim et al. | 370/329 |

FOREIGN PATENT DOCUMENTS

WO  2008000775 A1  1/2008

OTHER PUBLICATIONS

Devarasetty Ravi K. "Heuristic Algorithms for Adaptive Resource Management of Periodic Tasks in Soft Real-Time Distributed Systems", Retrieved at<<http://scholar.lib.vt.edu/theses/available/etd-02132001-142541/unrestricted/ravi_thesis.pdf>>, Feb. 6, 2001, Blacksburg, VA, pp. 60.

"Adaptive Power Management for Mobile Hard Drives", Retrieved at<<http://www.almaden.ibm.com/almaden/mobile_hard_drives.html>>, Jan. 1999, pp. 12.

* cited by examiner

*Primary Examiner* — Idriss N Alrobaye
(74) *Attorney, Agent, or Firm* — Toler Law Group, PC

(57) ABSTRACT

Systems and methods of adjusting allocated hardware resources to support a running software application are disclosed. A system includes adjustment logic to adjust an allocation of a first hardware resource to support a running software application. Measurement logic measures at least one hardware resource metric associated with the first hardware resource. Service level logic calculates an application service level based on the measured at least one hardware resource metric. When the first application service level satisfies a threshold application service level, the allocation of the first hardware resource is iteratively reduced to reach a reduced allocation level where the application service level does not satisfy the threshold application service level. In response thereto, the allocation of the first hardware resource is increased by an increment, such that the application service level again satisfies the threshold application service level.

17 Claims, 5 Drawing Sheets

TECHNIQUE FOR CONSERVING SOFTWARE APPLICATION RESOURCES

BACKGROUND

It is often difficult to estimate a specific amount of hardware resources that should be allocated to a software application to meet a desired application service level. The problem exists both at the time of software installation and after the software has been in use for a period of time. As a result of this difficulty, hardware resources are often over-allocated, leading to higher hardware and management costs and higher energy consumption.

An individual software application (e.g., a database application) may be deployed to a dedicated hardware resource (e.g., a computer). Over time, it may become apparent that costs are higher than necessary due to an over-allocation of hardware resources. It may be advantageous to re-install multiple software applications together on a reduced number of computers to share resources (e.g., computer server consolidation). In practice, this is often difficult because the installed software applications may have access to all of the available hardware resources (e.g., when hardware resources are dedicated to an individual software application). When the software applications are re-installed together on a shared computer, it may be difficult to properly allocate hardware resources of the shared computer between the different software applications.

Prediction algorithms may be used to allocate a minimum necessary amount of hardware for a software application. However, due to the complexity of many software application workloads and their relationships to hardware resources, these prediction algorithms may be unreliable. Alternatively, a software application may provide a capability to release memory available to itself to reduce resource usage. However, the process of releasing memory may result in an undesired change of application service level as a result of an increase in the usage of other hardware resources available to the software application. For example, releasing memory may increase permanent storage input/output (I/O), resulting in a poor quality application service level when the software application accesses the slower permanent storage devices.

SUMMARY

The present disclosure relates to an automated adaptive technique for reducing hardware resources allocated to support a running software application while supporting a desired application service level. The present disclosure takes advantage of adaptive runtime adjustment of hardware resources. As the hardware resources allocated to support the running software application are reduced, an application service level eventually fails to satisfy a threshold associated with the desired application service level. When the threshold is reached, the process of adaptive runtime adjustment is complete, leaving the software application with a level of hardware resources needed to meet the desired application service level. Since the reduction in hardware resources is applied dynamically in an execution environment, the technique is a more reliable and more accurate method of adjusting hardware resource allocations to a software application than certain conventional prediction-based techniques.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
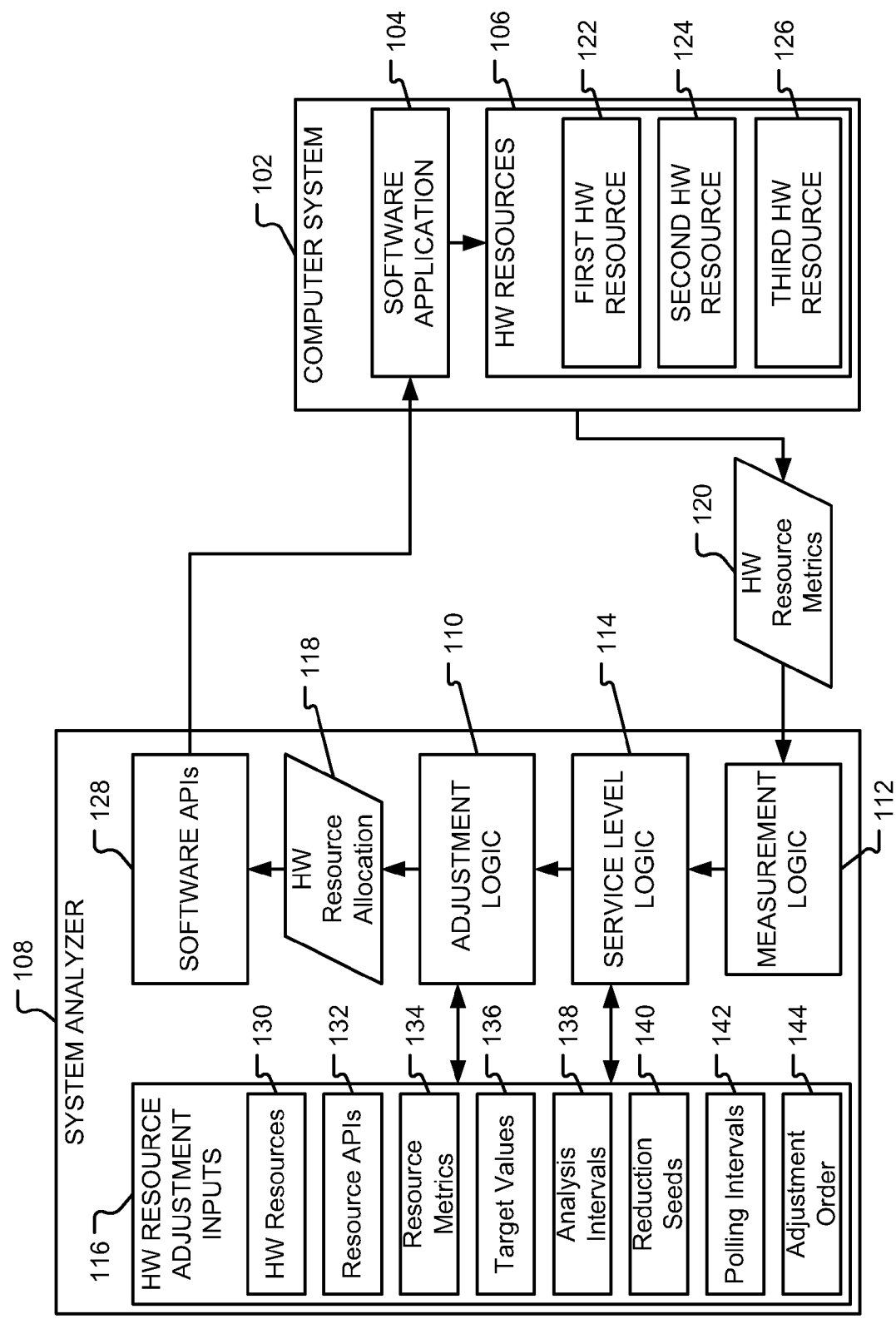
FIG. 1 is a block diagram that illustrates an embodiment of a system to adjust hardware resources allocated to support a software application and to measure an application service level.

The present disclosure presents an automated adaptive technique for reducing hardware resources allocated to support a running software application while supporting a desired application service level. The present disclosure relates to systems and methods of adaptive runtime adjustment of hardware resources supporting a running software application. One or more hardware resources supporting the running software application may be targeted for reduced allocation. Appropriate reduced allocations of the one or more hardware resources may be determined. By determing the appropriate reduced allocations and by re-allocating hardware resources accordingly, hardware and management costs and energy consumption may be reduced.

In a particular embodiment, a system is disclosed that includes adjustment logic to adjust an allocation of a first hardware resource to support a running software application. The system also includes measurement logic to measure at least one hardware resource metric associated with use of the first hardware resource by the software application. Service level logic calculates an application service level based on the measured at least one hardware resource metric. When the first application service level satisfies a threshold application service level, the allocation of the first hardware resource is iteratively reduced to reach a reduced allocation level where the application service level does not satisfy the threshold application service level. In response thereto, the allocation of the first hardware resource is increased by an increment, such that the application service level again satisfies the threshold application service level.

In another particular embodiment, a method includes identifying a first hardware resource of one or more hardware resources. The one or more hardware resources support execution of a running software application. At least one hardware resource metric associated with use of the first hardware resource by the running software application is measured. An application service level is calculated based on the measured at least one hardware resource metric associated with the first hardware resource. The calculated application service level is compared to a threshold application service level. When the calculated application service level satisfies the threshold application service level, an allocation of the first hardware resource is reduced until the calculated application service level does not satisfy the threshold application service level. When the calculated application service level does not satisfy the threshold application service level, the allocation of the first hardware resource is increased such that the calculated application service level satisfies the threshold application service level.

In another particular embodiment, a computer readable storage medium is disclosed. The computer readable storage medium includes instructions, that when executed by a processor, cause the processor to identify a first hardware resource of one or more hardware resources. The one or more hardware resources support execution of a running software application. At least one hardware resource metric associated with the first hardware resource is measured. An application service level based on the measured at least one hardware resource metric associated with the first hardware resource is calculated and compared to a threshold application service level. When the calculated application service level satisfies the threshold application service level, the allocation of the first hardware resource is reduced until the calculated application service level does not satisfy the threshold application service level. Upon detecting that the calculated application service level does not satisfy the threshold application service level, the allocation of the first hardware resource is automatically increased such that the calculated application service level satisfies the threshold application service level.

Referring to FIG. 1, a system is disclosed that includes a computer system 102 that includes one or more software applications (e.g., software application 104) and one or more hardware resources 106. A system analyzer 108 includes adjustment logic 110, measurement logic 112, service level logic 114, and one or more hardware resource adjustment inputs 116. The adjustment logic 110 adjusts an allocation 118 of a particular hardware resource of the computer system 102 to support a running software application (e.g., the software application 104). The allocation 118 of the particular hardware resource represents a fraction of the particular hardware resource that is made available to support the running software application. The measurement logic 112 measures hardware resource metrics 120 of the computer system 102.

The system uses a specific set of initial information (e.g., one or more hardware resource adjustment inputs 116) and subsequently applies a hardware resource adjustment method for reducing hardware resources allocated to support the running software application while measuring an impact on an application service level of the running software application. In the embodiment shown in FIG. 1, the one or more hardware resource adjustment inputs 116 include identified hardware resources 130, resource application programming interfaces (APIs) 132, resource metrics 134, target (e.g., threshold) values 136, analysis intervals 138, reduction seeds 140, polling intervals 142, and adjustment orders 144. One or more of these hardware resource adjustment inputs 116 may be included in the hardware resource adjustment method.

The identified hardware resources 130 represent particular hardware resources that are targeted for reduction (e.g., an amount of memory or a number of available processors). The identified hardware resources 130 represent one or more hardware resources supporting the running software application. The resource APIs 132 identify one or more software APIs used to adjust allocations of each of the identified hardware resources 130. Thus, software APIs may be used to adjust an amount (e.g., an allocation) of a particular hardware resource available to support the running software application. The resource metrics 134 include hardware resource metrics and the APIs identified as needed to measure an application service level of the running software application.

For example, the identified hardware resource metrics 134 may include an input/output (I/O) queue length, a transaction latency, or a usage of allocated processors, among other alternatives. The target values 136 identify satisfactory average and peak values for each of the identified hardware resource metrics 134 in order to satisfy a desired application service level (e.g., a threshold application service level). The threshold application service level may represent a service level agreement (SLA) with respect to the running software application. For example, the SLA may specify an acceptable level of performance of the running software application. The identified hardware resource metrics 134 may be used to determine if the running software application performs at an acceptable level to satisfy the SLA.

The analysis intervals 138 represent time intervals to perform analysis of an impact on the application service level of a change of allocation of a particular hardware resource. A reduction in the allocation of the particular hardware resource may be reverted at any time during the analysis interval to an original value if the threshold application service level is not satisfied. Reduction seeds 140 represent changes of allocation of particular hardware resources at various iterative reduction stages. For example, a first reduction seed may represent a first reduction of allocation of the particular hardware resource during a first analysis interval, while a second reduction seed may represent a second reduction during a second analysis interval. Many periodic measurements may be taken at different times during a particular analysis interval, and polling intervals 142 represent time intervals separating the periodic measurements. An adjustment order 144 identifies an order in which allocations of particular hardware resources are adjusted. For example, an allocation of a first hardware resource 122 to support the running software application may be adjusted before adjusting allocations of other hardware resources (e.g., a second hardware resource 124 or a third hardware resource 126).

In the embodiment shown in FIG. 1, the one or more hardware resources 106 of the computer system 102 include the first hardware resource 122, the second hardware resource 124, and the third hardware resource 126. In alternative embodiments, the computer system 102 may include any number of hardware resources 106. For example, the first hardware resource 122 may include a logical processing resource that is associated with at least one physical processing unit (e.g., a central processing unit (CPU)). The second hardware resource 124 may include a logical memory resource that is associated with at least one physical storage device. The third hardware resource 126 may include a logical bandwidth resource associated with at least one device that provides physical communication bandwidth (e.g., a network resource). Other hardware resources may also be included in the computer system 102. For example, the one or more hardware resources 106 may include both physical hardware resources and virtual hardware resources (e.g., cloud computing).

In operation, the adjustment logic 110 provides a first allocation 118 of a particular hardware resource to support the running software application 104. For example, the first allocation 118 may be an allocation of the first hardware resource 122 of the one or more hardware resources 106 of the computer system 102. The first hardware resource 122 supports execution of the software application 104 during runtime. The first allocation 118 of the first hardware resource 122 is communicated from the adjustment logic 110 to the software application 104 via one or more software APIs 128. The software APIs 128 may reside on the system analyzer 108, as in FIG. 1, or the software APIs 128 may reside on the computer system 102 where the software application 104 is located, or on any other computing system. The first allocation 118 of the first hardware resource 122 represents a fraction of the first hardware resource 108 that is made available to the software application 104 (e.g., a percentage of the first hardware resource 108 allocated to the software application 104). For example, if the first hardware resource 122 is a processor, the first allocation 118 may be 50% of the available processor capacity. As another example, if the first hardware resource 122 is a storage device, the first allocation 118 may be 30% of the storage space available on the storage device. For example, the software application 104 may include a Microsoft SQL Server software application, and the first allocation 118 to a SQL Server file may be 30% of the storage space available.

The software application 104 executes on the computer system 102 and has access to the first allocation 118 of the first hardware resource 122 during a first analysis interval (e.g., one of the analysis intervals 138 of the hardware resource adjustment inputs 116). The first analysis interval represents a time interval to perform analysis of an impact of a change of allocation of a particular hardware resource on an application service level of the software application 104. Thus, during the first analysis interval, the first allocation 118 of the first hardware resource 122 that is available to the software application 104 remains fixed. This allows measurements to be made for a long enough period of time to obtain accurate hardware resource metrics 120.

The measurement logic 112 measures at least one hardware resource metric 120 associated with the first hardware resource 122 during the first analysis interval. The measurement logic 112 may measure peak metrics, average metrics, or any other hardware resource metrics. For example, the hardware resource metrics 120 may include a peak input/output (I/O) queue length, a peak transaction latency, a peak usage of allocated processing units, a peak usage of allocated memory, and a peak usage of allocated storage space. As another example, the hardware resource metrics 120 may include an average I/O queue length, an average transaction latency, an average usage of allocated processing units, an average usage of allocated memory, and an average usage of allocated storage space. The measurement logic 112 may periodically measure hardware resource metrics 120 during the first analysis interval. For example, many periodic measurements may be taken at different times that are separated by a time interval (e.g., a polling interval).

The service level logic 114 calculates a first application service level based on the hardware resource metrics 120 measured during the first analysis interval. The first application service level calculated by the service level logic 114 is compared to a threshold application service level (e.g., one of the target values 136 of the one of the hardware resource adjustment inputs 116). The threshold service level identifies satisfactory average and peak values for the measured hardware resource metrics 120. Thus, the threshold application service level represents an acceptable level of performance of the software application 104.

When the first application service level calculated by the service level logic 114 satisfies the threshold application service level, the adjustment logic 110 provides a second allocation 118 of the first hardware resource 122 to support the running software application 104. The second allocation 118 is reduced from the initial allocation (e.g., the first allocation). In a particular embodiment, the second allocation 118 is reduced from the initial allocation by a first reduction seed (e.g., one of the reduction seeds 140 of the one or more hardware resource adjustment inputs 116). For example, the second allocation 118 may be 25% lower than the initial allocation. Thus, if the software application 104 is initially allocated 80% of the first hardware resource 122, the second allocation 118 may be 60% of the first hardware resource 122. As an example, if the first hardware resource 122 is a processor resource, a percentage of processor capacity (e.g., CPU capacity) available to the software application 104 may be reduced from 80% of available CPU capacity to 60% of available CPU capacity. The second allocation 118 is communicated from the adjustment logic 110 to the software application 104 via the software APIs 128.

The measurement logic 112 measures the hardware resource metrics 120 during a second analysis interval. The second analysis interval may be the same length of time as the first analysis interval or may be a different length of time as compared to the first analysis interval. Further, the second analysis interval may begin immediately after the first analysis interval or there may be a delay between the first and second analysis intervals. The service level logic 114 calculates a second application service level based on the hardware resource metrics 120 measured during the second analysis interval. When the second application service level calculated by the service level logic 114 satisfies the threshold application service level, the adjustment logic 110 provides a third allocation 118 of the first hardware resource 122 to support the running software application 104. The third allocation 118 is reduced from the previous allocation (e.g., the second allocation). In a particular embodiment, the third allocation 118 is reduced from the previous allocation by a second reduction seed. Reduction seeds may vary between allocation reductions, or the reduction seeds may be the same. Continuing from the previous example, if the second reduction seed is the same as the first reduction seed, the percentage of CPU capacity available to the software application 104 may be reduced from 60% of available CPU capacity to 45% of available CPU capacity. Alternatively, if the second reduction seed is not the same as the first reduction seed, the percentage of available CPU capacity may be reduced by a different percentage. For example, the percentage of CPU capacity available to the software application 104 may be reduced from 60% of available CPU capacity to 54% of available CPU capacity (e.g., a 10% reduction).

The adjustment logic 110 continuously and iteratively provides reduced allocations 118 of the first hardware resource 122 until the service level logic 114 calculates an application service level that does not satisfy the threshold application service level. When the calculated application service level no longer satisfies the threshold application service level, the allocation of the first hardware resource 122 to support the running software application 104 is determined to be inadequate. When the allocation is inadequate, the last allocation adjustment may be reverted such that an adequate allocation of the particular hardware resource is maintained. For example, when the third application service level temporarily does not satisfy the threshold application service level, the adjustment logic 110 provides a fourth allocation 118 of the first hardware resource 122 to support the running software application 104 upon detection of the non-satisfied application service level. The fourth allocation 118 of the first hardware resource 122 is increased from the previous allocation (e.g., the third allocation). The fourth allocation 118 may be the same as the second allocation (e.g., before the most recent allocation reduction). Thus, a last allocation of the first hardware resource 122 that resulted in an application service level that satisfied the threshold application service level may be considered an appropriate reduced allocation of the first hardware resource 122 to support the software application 104.

The fourth allocation 118 may be assigned to the first hardware resource 122. Alternatively, further calculations may be performed using smaller allocation reduction percentages (e.g., reduction seeds 140) to better pinpoint the appropriate reduced allocation of the first hardware resource 122 to support the software application 104.

In a particular embodiment, a series of other hardware resources supporting the software application 104 (e.g., the second hardware resource 124 or the third hardware resource 126) are analyzed based on an adjustment order 144. The adjustment order 144 identifies an order in which allocations of individual hardware resources are adjusted. For example, the adjustment order 144 may identify the second hardware resource 124 and the third hardware resource 126 as the next hardware resources to be adjusted.

In a particular embodiment, the adjustment logic 110 provides a first allocation 118 of the second hardware resource 124 to support the running software application 104. The measurement logic 112 measures hardware resource metrics 120 associated with the second hardware resource 124 during an analysis interval. The service level logic 114 calculates an application service level based on the hardware resource metrics 120 measured during the analysis interval. When the application service level satisfies the threshold application service level, the adjustment logic 110 reduces the allocation 118 of the second hardware resource 124 until the service level logic 114 calculates an application service level that does not satisfy the threshold application service level. Thus, a last allocation of the second hardware resource 124 that resulted in an application service level that satisfied the threshold application service level may be considered an appropriate reduced allocation of the second hardware resource 124 to support the software application 104. In a particular embodiment, the last allocation of the second hardware resource 124 that resulted in a satisfactory application service level may be assigned to the second hardware resource 124. Alternatively, further calculations may be performed using smaller allocation reduction percentages (e.g., reduction seeds 140) to better pinpoint the appropriate reduced allocation of the second hardware resource 124 to support the software application 104. Similarly, an appropriate reduced allocation of the third hardware resource 126 to support the software application 104 may be determined next (e.g., based on the adjustment order 144).

Figure 2:
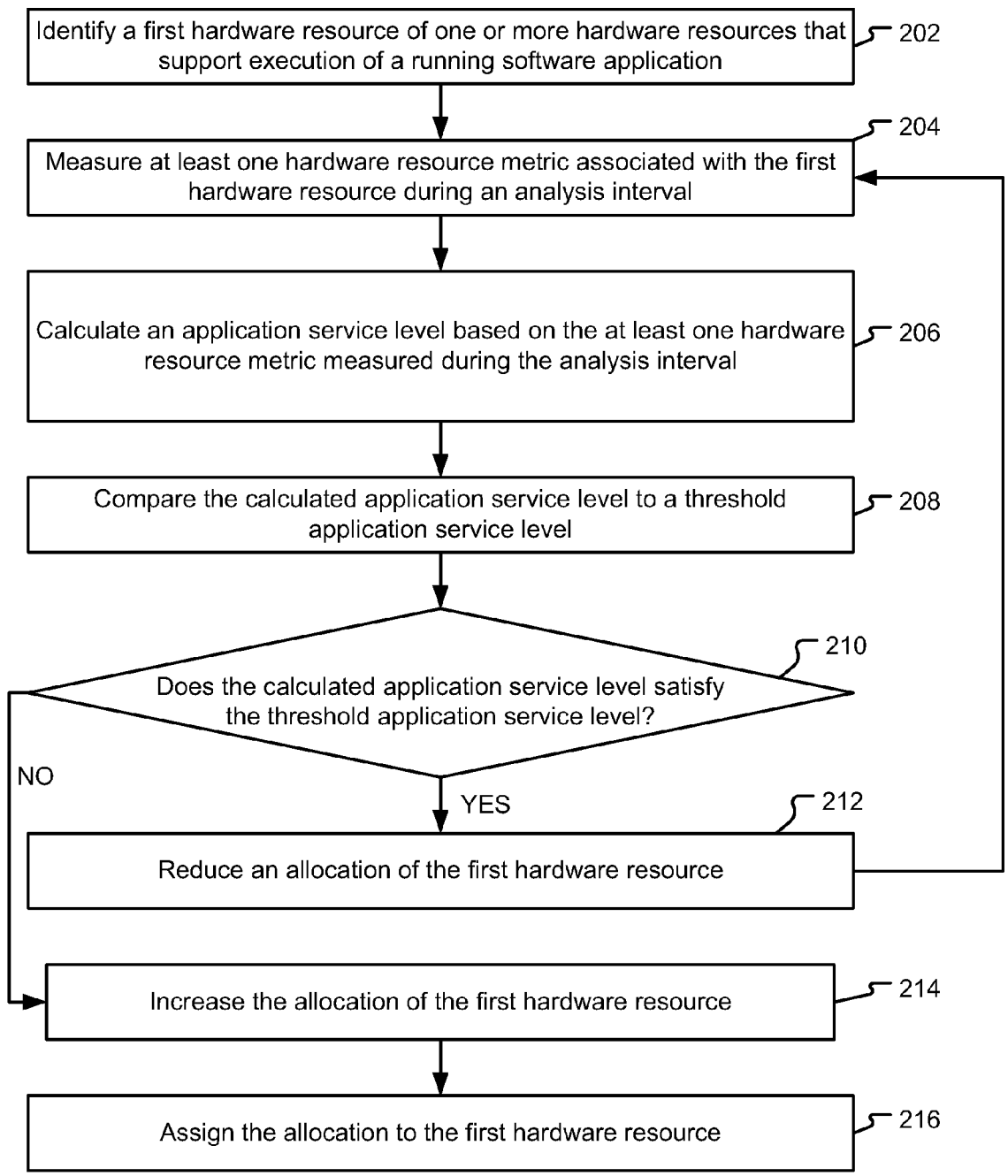
FIG. 2 is a flow diagram that illustrates an embodiment of a method of adjusting hardware resources allocated to support a software application.

Referring to FIG. 2, an embodiment of a method that adjusts hardware resources allocated to support execution of a software application during runtime is illustrated.

The method includes identifying a first hardware resource of one or more hardware resources that support execution of a running software application, at 202. One or more hardware resources supporting the software application during runtime are identified as targeted for reduced allocation, and the first hardware resource is one of the identified hardware resources. For example, the first hardware resource may include a processor resource (e.g., a CPU), a memory resource, a network resource, another physical hardware resource, or a virtual hardware resource (e.g., a cloud computing resource).

At least one hardware resource metric associated with the first hardware resource is measured during a first analysis interval, at 204. For example, the at least one hardware resource metric may include a peak input/output (I/O) queue length, a peak transaction latency, a peak usage of allocated processing units, a peak usage of allocated memory, or a peak usage of allocated storage space. As another example, the at least one hardware resource metric may include an average I/O queue length, an average transaction latency, an average usage of allocated processing units, an average usage of allocated memory, or an average usage of allocated storage space.

In a particular embodiment, the at least one hardware resource metric is periodically measured during the first analysis interval, where a polling interval separates each of a plurality of periodic measurements. The polling interval is a time interval between periodic measurements of the at least one hardware resource metric. The polling interval between each measurement may be the same amount of time or a different amount of time. For example, a first hardware resource metric may be measured at a first time, a second hardware resource metric may be measured at a second time, and a third hardware resource metric may be measured at a third time. The length of time between the first time and the second time may be different from the length of time between the second time and the third time. As an example, the length of time between the first measurement and the second measurement may be ten minutes, and the length of time between the second measurement and the third measurement may be twenty minutes. Alternatively, any other length of time may separate measurements of the hardware resource metrics.

A first application service level is calculated based on the at least one hardware resource metric measured during the first analysis interval, at 206. The calculated first application service level is compared to a threshold application service level, at 208. At 210, it is determined whether the calculated first application service level satisfies the threshold application service level. When the calculated first application service level satisfies the threshold application service level, the method includes reducing a first allocation of the first hardware resource to a second allocation of the first hardware resource, at 212. For example, if the first hardware resource is a processor resource, the first allocation may be 80% of the available CPU capacity. The second allocation of the first hardware resource may be 25% lower than the first allocation. Thus, a percentage of CPU capacity available to the software application may be reduced from 80% of available CPU capacity to 60% of available CPU capacity. In the particular embodiment illustrated in FIG. 2, after reducing the allocation of the first hardware resource, the method returns to 204. By reducing the allocation of the first hardware resource iteratively, the allocation of the first hardware resource is reduced until the calculated application service level no longer satisfies the threshold application service level.

During the temporary period when the calculated first application service level does not satisfy the threshold application service level, the method includes increasing the allocation of the first hardware resource upon detection of the non-satisfied application service level, at 214. By increasing the allocation, an adequate allocation of the first hardware resource is maintained. The allocation is assigned to the first hardware resource, at 216. In a particular embodiment, the last allocation of the first hardware resource that resulted in a calculated application service level that satisfied the threshold application service level may be considered an appropriate reduced allocation of the first hardware resource to support the software application. Alternatively, further calculations may be performed using smaller allocation reduction percentages (e.g., reduction seeds 140 of FIG. 1) to better pinpoint the appropriate reduced allocation of the first hardware resource to support the software application.

Figure 3:
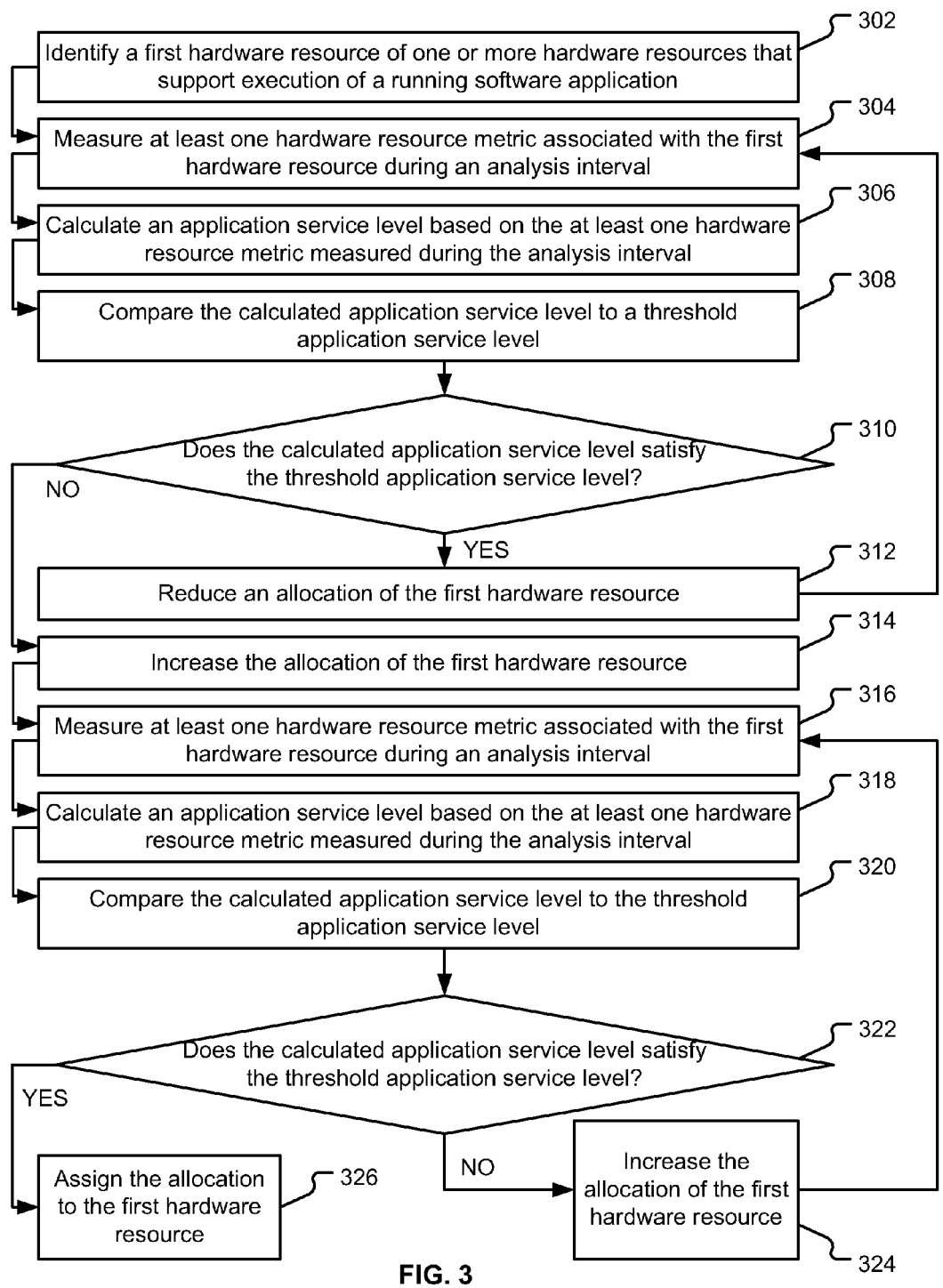
FIG. 3 is a flow diagram that illustrates another embodiment of a method of adjusting hardware resources allocated to support a software application.

Referring to FIG. 3, another embodiment of a method of adjusting hardware resources allocated to support execution of a software application during runtime is illustrated.

The method includes identifying a first hardware resource of one or more hardware resources allocated to support execution of a software application during runtime, at 302.

One or more hardware resources supporting the software application during runtime are identified as targeted for reduced allocation, and the first hardware resource is one of the identified hardware resources. For example, the first hardware resource may include a processor resource (e.g., a CPU), a memory resource, a network resource, another physical hardware resource, or a virtual hardware resource (e.g., a cloud computing element).

At least one hardware resource metric associated with the first hardware resource is measured during an analysis interval (e.g., a first analysis interval), at 304. For example, the at least one hardware resource metric may include a peak input/output (I/O) queue length, a peak transaction latency, a peak usage of allocated processing units, a peak usage of allocated memory, or a peak usage of allocated storage space. As another example, the at least one hardware resource metric may include an average I/O queue length, an average transaction latency, an average usage of allocated processing units, an average usage of allocated memory, or an average usage of allocated storage space.

An application service level (e.g., a first application service level) is calculated based on the at least one hardware resource metric measured during the first analysis interval, at 306. The calculated application service level (e.g., a first application service level) is compared to a threshold application service level, at 308. At 310, it is determined whether the calculated application service level satisfies the threshold application service level. When the calculated application service level satisfies the threshold application service level, the method includes reducing an allocation of the first hardware resource, at 312. For example, the allocation of the first hardware resource may be reduced from a first allocation to a second allocation. For example, if the first hardware resource is a storage device, the first allocation may be 80% of the storage space available on the storage device. The second allocation of the first hardware resource may be 25% lower than the first allocation. Thus, a percentage of storage space available to the software application may be reduced from 80% of available storage space to 60% of available storage space.

In the particular embodiment illustrated in FIG. 3, after reducing the allocation of the first hardware resource, the method returns to 304. The at least one hardware resource metric associated with the first hardware resource is measured during a second analysis interval. An application service level (e.g., a calculated second application service level) is calculated based on the at least one hardware resource metric measured during the second analysis interval, at 306. The calculated application service level (e.g., a second application service level) is compared to the threshold application service level, at 308. At 310, it is determined whether the calculated application service level satisfies the threshold application service level. When the calculated application service level satisfies the threshold application service level, the method includes further reducing the allocation of the first hardware resource, at 312. For example, the allocation of the first hardware resource may be reduced from the second allocation to a third allocation. Continuing from the previous example, the second allocation may be reduced from 60% of available storage space to the third allocation of 45% of available storage space.

After reducing the allocation of the first hardware resource, the method returns to 304. The at least one hardware resource metric associated with the first hardware resource is measured during a third analysis interval. An application service level (e.g., a third application service level) is calculated based on the at least one hardware resource metric measured during the third analysis interval, at 306. The calculated application service level is compared to the threshold application service level, at 308. At 310, it is determined whether the calculated application service level satisfies the threshold application service level. When the calculated application service level satisfies the threshold application service level, the method includes further reducing the allocation of the first hardware resource, at 312. Thus, the method includes reducing the allocation of the first hardware resource until the calculated application service level no longer satisfies the threshold application service level. When the calculated service level no longer satisfies the threshold application service level, the allocation is not an appropriate reduced allocation level to support the software application.

In a particular embodiment, when the calculated application service level does not satisfy the threshold application service level, the method proceeds to 314. At 314, the method includes increasing the allocation of the first hardware resource (e.g., from the third allocation to a fourth allocation). In the embodiment shown in FIG. 3, further calculations are performed to better pinpoint the appropriate reduced allocation of the first hardware resource to support the software application. For example, the third allocation of the first hardware resource (e.g., 45% of available storage space) failed to satisify the threshold application service level. The second allocation of the first hardware resource (e.g., 60% of available storage space) satisified the threshold application service level. Therefore, the appropriate reduced allocation is between 45% and 60% of available storage capacity. In a particular embodiment, at 314, the third allocation (e.g., 45% of available storage space) is increased to an allocation that is less than the second allocation (e.g., 60% of available storage space). For example, the third allocation may be increased by 50% of the difference between the second allocation and the third allocation, resulting in an increased allocation of 52.5% of available storage capacity.

At least one hardware resource metric associated with the first hardware resource is measured during an analysis interval of the first hardware resource, at 316. An application service level is calculated based on the at least one hardware resource metric measured during the analysis interval, at 318. The calculated application service level is compared to the threshold application service level, at 320. At 322, it is determined whether the calculated application service level satisfies the threshold application service level.

When the calculated application service level does not satisfy the threshold application service level, the method proceeds to 324. At 324, the method includes increasing the allocation of the first hardware resource and proceeding to 316 for further measurements and associated calculations. In this case, the increased allocation of the first hardware resource (e.g., 52.5% of available storage space) failed to satisify the threshold application service level. Therefore, the appropriate reduced allocation is between 52.5% and 60% of available storage capacity. As an example, at 324, the allocation of the first hardware resource may be increased from 52.5% of available storage capacity to 55% of available storage capacity. The method proceeds to 316 for further measurements and calculations. Multiple iterations of increasing the allocation of the first hardware resource may be used to determine an appropriate reduced allocation of the first hardware resource. When the calculated application service level satisfies the threshold application service level, the method includes assigning the allocation to the first hardware resource, at 326.

Figure 4:
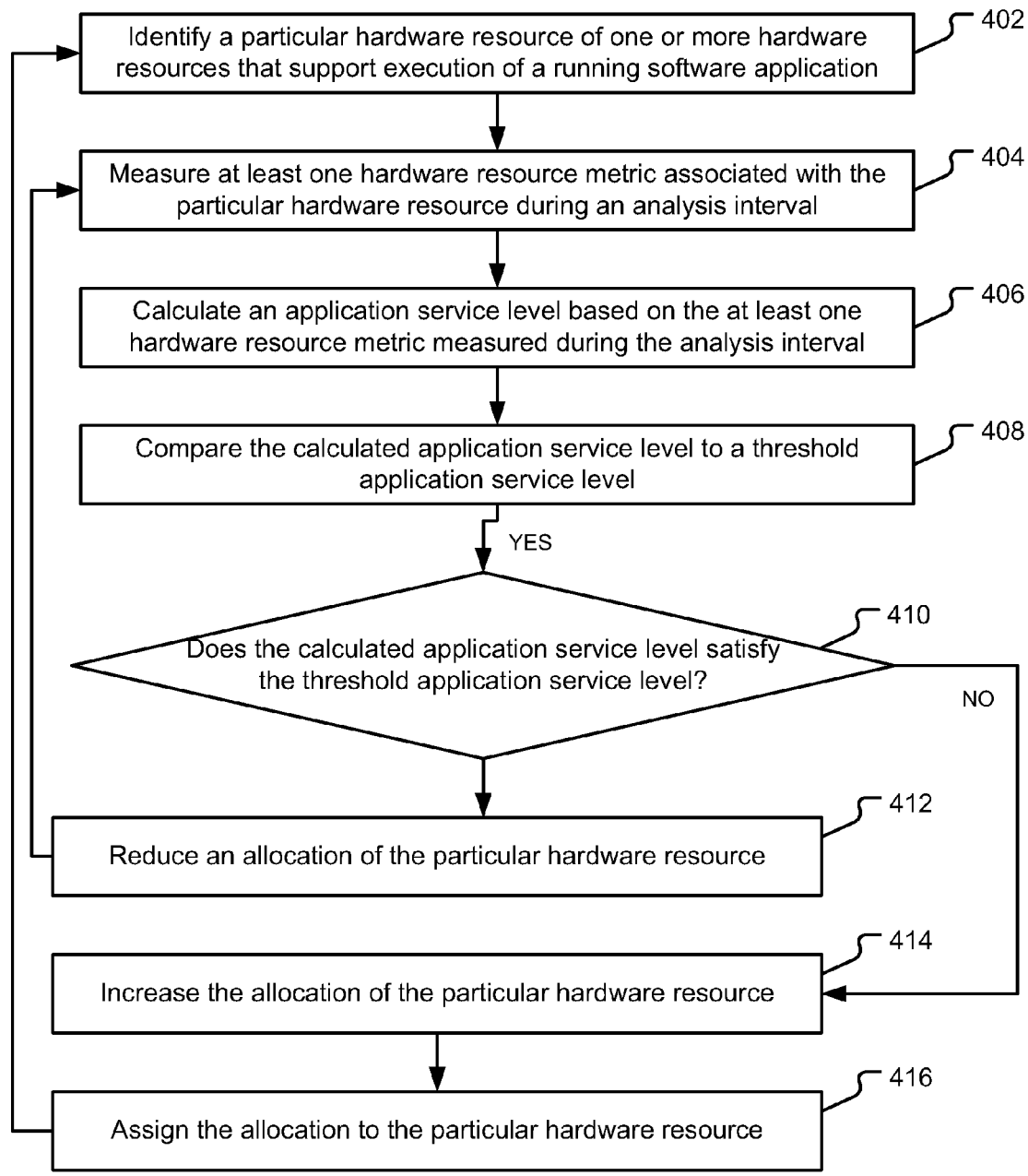
FIG. 4 is a flow diagram that illustrates another embodiment of a method of adjusting hardware resources allocated to support a software application.

Referring to FIG. 4, another embodiment of a method of adjusting hardware resources allocated to support execution of a software application during runtime is illustrated.

The method includes identifying a first hardware resource of one or more hardware resources allocated to support execution of a software application during runtime, at 402. One or more hardware resources supporting the software application during runtime are identified as targeted for reduced allocation, and the first hardware resource is one of the identified hardware resources. For example, the first hardware resource may include a processor resource (e.g., a CPU), a memory resource, a network resource, another physical hardware resource, or a virtual hardware resource.

At least one hardware resource metric associated with the first hardware resource is measured during an analysis interval (e.g., a first analysis interval), at 404. For example, the at least one hardware resource metric may include a peak input/output (I/O) queue length, a peak transaction latency, a peak usage of allocated processing units, a peak usage of allocated memory, or a peak usage of allocated storage space. As another example, the at least one hardware resource metric may include an average I/O queue length, an average transaction latency, an average usage of allocated processing units, an average usage of allocated memory, or an average usage of allocated storage space.

An application service level (e.g., a first application service level) is calculated based on the at least one hardware resource metric measured during the first analysis interval, at 406. The calculated application service level is compared to a threshold application service level, at 408. At 410, it is determined whether the calculated application service level satisfies the threshold application service level. When the calculated application service level satisfies the threshold application service level, the method includes reducing an allocation of the first hardware resource, at 412. For example, the allocation of the first hardware resource may be reduced from a first allocation to a second allocation. For example, if the first hardware resource is a memory resource, the first allocation may be 80% of total available memory. The second allocation of the first hardware resource may be 25% lower than the first allocation. Thus, a percentage of memory available to the software application may be reduced from 80% of available memory to 60% of available memory.

As previously described, after reducing the allocation of the first hardware resource, the method returns to 404. The method includes iteratively reducing the allocation of the first hardware resource until the calculated application service level no longer satisfies the threshold application service level.

During the temporary period when the calculated application service level does not satisfy the threshold application service level, the method includes increasing the allocation of the first hardware resource upon detection of the non-satisfied application service level, at 414. By increasing the allocation, an adequate allocation of the first hardware resource is maintained. The allocation is assigned to the first hardware resource, at 416. In a particular embodiment, the last allocation of the first hardware resource that resulted in a calculated application service level that satisfied the threshold application service level may be considered the appropriate reduced allocation of the first hardware resource to support the software application. Alternatively, as previously described, further calculations may be performed to better pinpoint the appropriate reduced allocation of the first hardware resource to support the software application.

After assigning the appropriate reduced allocation to the first hardware resource, the method returns to 402 to identify a second hardware resource of the one or more hardware resources allocated to support execution of the software application during runtime.

At least one hardware resource metric associated with the second hardware resource is measured during an analysis interval, at 404. For example, the at least one hardware resource metric may include a peak input/output (I/O) queue length, a peak transaction latency, a peak usage of allocated processing units, a peak usage of allocated memory, or a peak usage of allocated storage space. As another example, the at least one hardware resource metric may include an average I/O queue length, an average transaction latency, an average usage of allocated processing units, an average usage of allocated memory, or an average usage of allocated storage space.

An application service level is calculated based on the at least one hardware resource metric measured during the analysis interval, at 406. The calculated application service level is compared to the threshold application service level, at 408. At 410, it is determined whether the calculated application service level satisfies the threshold application service level. When the calculated application service level satisfies the threshold application service level, the method includes reducing an allocation of the second hardware resource, at 412. For example, the allocation of the second hardware resource may be reduced from a first allocation to a second allocation. For example, if the second hardware resource is a network resource, the first allocation may be 80% of total available network bandwidth. The second allocation may be 25% lower than the first allocation. Thus, a percentage of network bandwidth available to the software application may be reduced from 80% of total available network bandwidth to 60% of total available network bandwidth.

As previously described, after reducing the allocation of the second hardware resource, the method returns to 404. The method includes iteratively reducing the allocation of the second hardware resource until the calculated application service level no longer satisfies the threshold application service level.

During the temporary period when the calculated application service level does not satisfy the threshold application service level, the method includes increasing the allocation of the second hardware resource upon detection of the non-satisfied application service level, at 414. By increasing the allocation, an adequate allocation of the second hardware resource is maintained. The allocation is assigned to the second hardware resource, at 416. In a particular embodiment, the last allocation of the second hardware resource that resulted in a calculated application service level that satisfied the threshold application service level may be considered the appropriate reduced allocation of the second hardware resource to support the software application. Alternatively, as previously described, further calculations may be performed to better pinpoint the appropriate reduced allocation of the second hardware resource to support the software application. Further, reduced allocations of other hardware resources may be determined.

It should be appreciated that the appropriate reduced allocation of other hardware resources to support the software application may also be determined. For example, after assigning the appropriate reduced allocation to the second hardware resource, the method may return to 402 to identify a third hardware resource of the one or more hardware resources allocated to support execution of the software application during runtime.

Figure 5:
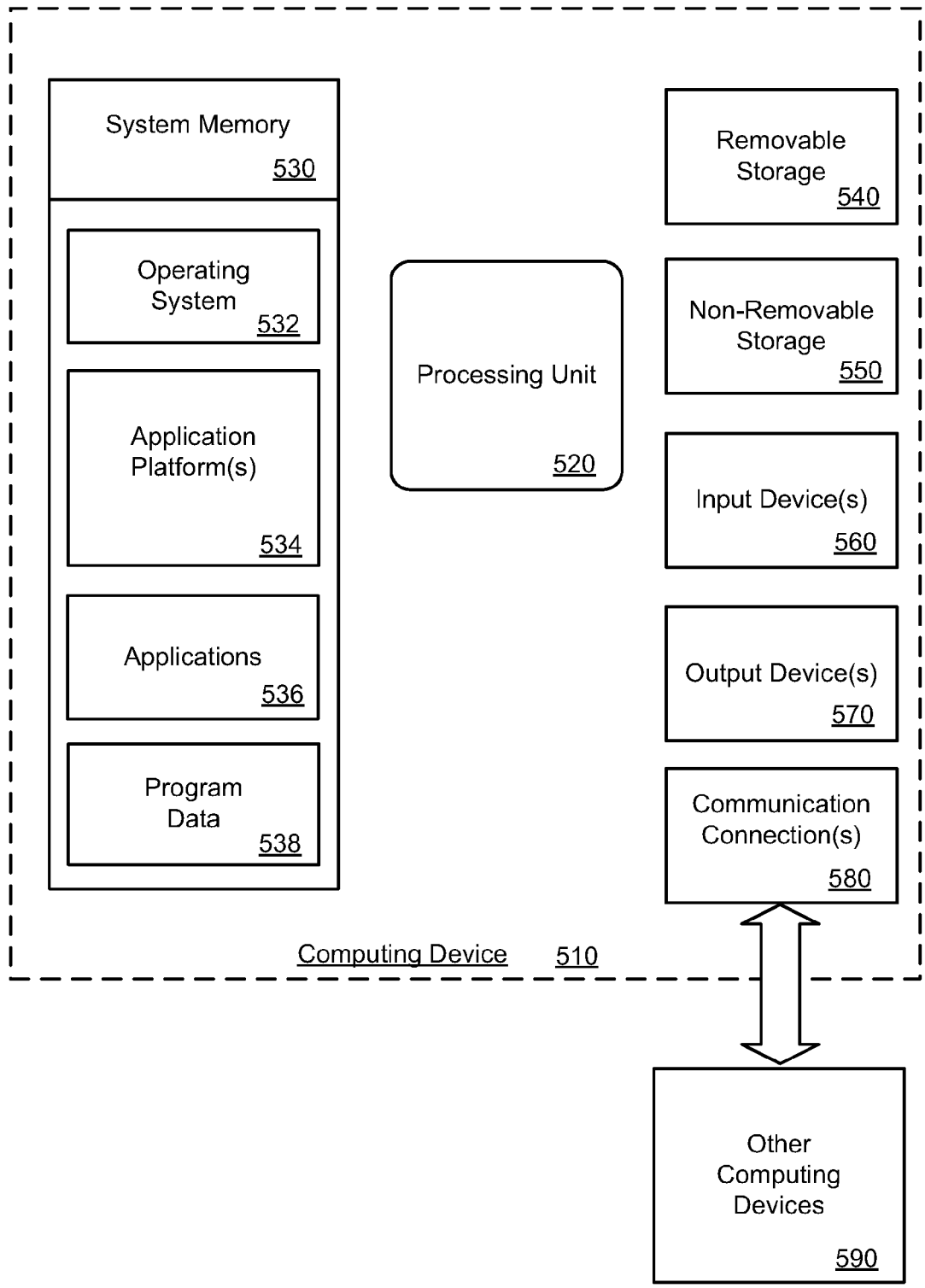
FIG. 5 is a block diagram depicting a general purpose computing system operable to enable computer-implemented methods as illustrated in FIGS. 1-4.

FIG. 5 shows a block diagram of a computing environment 500 including a general purpose computer device 510 operable to support embodiments of computer-implemented methods and computer program products according to the present disclosure. In a basic configuration, the computing device 510 may include a computer (e.g., a server) configured to process transactions such as described with reference to FIG. 1.

The computing device 510 typically includes at least one processing unit 520 and system memory 530. Depending on the exact configuration and type of computing device, the system memory 530 may be volatile (such as random access memory or "RAM"), non-volatile (such as read-only memory or "ROM," flash memory, and similar memory devices that maintain the data they store even when power is not provided to them) or some combination of the two. The system memory 530 typically includes an operating system 532, one or more application platforms, one or more applications 536, and may include program data 538.

The computing device 510 may also have additional features or functionality. For example, the computing device 510 may also include removable and/or non-removable additional data storage devices such as magnetic disks, optical disks, tape, and standard-sized or miniature flash memory cards. Such additional storage is illustrated in FIG. 5 by removable storage 540 and non-removable storage 550. Computer storage media may include volatile and/or non-volatile storage and removable and/or non-removable media implemented in any method or technology for storage of information such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store the desired information and which can be accessed by computing device 510. Any such computer storage media may be part of the device 510. The computing device 510 may also have input device(s) 560 such as a keyboard, mouse, pen, voice input device, touch input device, etc. Output device(s) 570 such as a display, speakers, printer, etc. may also be included.

The computing device 510 also contains one or more communication connections 580 that allow the computing device 510 to communicate with other computing devices 590, such as one or more client computing systems or other computers, over a wired or a wireless network. The one or more communication connections 580 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 5 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the one or more hardware resources 106 of FIG. 1 may be physical resources or virtual resources. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system comprising;
adjustment logic to adjust an allocation of a first hardware resource to support a running software application;

measurement logic to measure at least one hardware resource metric associated with the first hardware resource; wherein the at least one hardware resource metric includes a peak and an average hardware resource metric; and service level logic to calculate an application service level based on the measured at least one hardware resource metric;

wherein when the application service level satisfies a threshold application service level, the allocation of the first hardware resource is iteratively reduced to reach a reduced allocation level where the application service level does not satisfy the threshold application service level, and in response thereto, the allocation of the first hardware resource is increased by an increment, such that the application service level again satisfies the threshold application service level;

wherein the increment is less than a reduction amount associated with a previous iterative reduction that resulted in the application service level not satisfying the threshold application service level;

wherein the at least one hardware resource metric is periodically measured and wherein a polling interval separates each of a plurality of the periodic measurements.

2. The system of claim 1, wherein the threshold application service level is a service level agreement (SLA) threshold.

3. The system of claim 1, wherein the application service level is temporarily reduced below the threshold application service level.

4. The system of claim 1, wherein the allocation of the first hardware resource is iteratively reduced multiple times to reach the reduced allocation level where the application service level does not satisfy the threshold application service level.

5. The system of claim 1, wherein the running software application includes a database application.

6. The system of claim 1, wherein an allocation of a second hardware resource supporting the running software application is iteratively reduced until a calculated application service level does not satisfy the threshold application service level, and in response thereto, the allocation of the second hardware resource is increased such that the application service level satisfies the threshold application service level.

7. The system of claim 1, wherein the allocation of the first hardware resource is iteratively reduced by a reduction seed.

8. The system of claim 1, further comprising one or more software application programming interfaces (APIs) to interface with the running software application, wherein the one or more software APIs adjust allocation of one or more hardware resources available to the running software application.

9. A method comprising:
identifying a first hardware resource of one or more hardware resources, wherein the one or more hardware resources support execution of a running software application;
measuring at least one hardware resource metric associated with the first hardware resource wherein the at least one hardware resource includes a peak and an average hardware resource metric;
calculating an application service level based on the measured at least one hardware resource metric associated with the first hardware resource;
comparing the calculated application service level to a threshold application service level;
when the calculated application service level satisfies the threshold application service level, iteratively reducing an allocation of the first hardware resource until the calculated application service level does not satisfy the threshold application service level and in response thereto increasing the allocation of the first hardware resource by an increment such that the calculated application service level again satisfies the threshold application service level wherein the increment is less than a reduction amount associated with a previous iterative reduction that resulted in the calculated application service level not satisfying the threshold application service level; and wherein the at least one hardware resource metric is periodically measured and wherein a polling interval separates each of a plurality of the periodic measurements.

10. The method of claim 9, wherein the allocation of the first hardware resource is adjusted using a first application programming interface (API) associated with the first hardware resource.

11. The method of claim 9, further comprising:
identifying a second hardware resource of the one or more hardware resources;
measuring at least one hardware resource metric associated with the second hardware resource;
calculating the application service level further based on the measured at least one hardware resource metric associated with the second hardware resource;
when the calculated application service level satisfies the threshold application service level, reducing the allocation of the second hardware resource until the calculated application service level does not satisfy the threshold application service level; and
when the calculated application service level does not satisfy the threshold application service level, increasing the allocation of the second hardware resource such that the calculated application service level satisfies the threshold application service level.

12. The method of claim 11, wherein the allocation of the second hardware resource is adjusted using a second application programming interface (API) associated with the second hardware resource.

13. A computer readable storage medium comprising instructions, that when executed by a processor, cause the processor to:
identify a first hardware resource of one or more hardware resources, wherein the one or more hardware resources support execution of a running software application;
measure at least one hardware resource metric associated with the first hardware resource wherein the at least one hardware resource metric includes a peak and an average hardware resource metric;
calculate an application service level based on the measured at least one hardware resource metric associated with the first hardware resource;
compare the calculated application service level to a threshold application service level; and
when the calculated application service level satisfies the threshold application service level, iteratively reduce the allocation of the first hardware resource until the calculated application service level does not satisfy the threshold application service level, and upon detecting that the calculated application service level does not satisfy the threshold application service level, automatically increase the allocation of the first hardware resource by an increment such that the calculated application service level satisfies the threshold application service level wherein the increment is less than a reduction amount associated with a previous iterative reduction that resulted in the calculated application service level not satisfying the threshold application service level; and wherein the at least one hardware resource metric is periodically measured and wherein a polling interval separates each of a plurality of the periodic measurements.

14. The computer readable storage medium of claim 13, further comprising instructions, that when executed by the processor, cause the processor to:

identify a second hardware resource of the one or more hardware resources;

measure at least one hardware resource metric associated with the second hardware resource; and calculate the application service level further based on the measured at least one hardware resource metric associated with the second hardware resource.

15. The computer readable storage medium of claim 13, wherein the one or more hardware resources include one or more of a processor resource and a memory resource.

16. The computer readable storage medium of claim 13, wherein the at least one hardware resource metric includes at least one of a peak input/output queue length, a peak transaction latency, a peak amount of usage of processing units, a peak amount of allocated memory, and a peak amount of usage of storage space.

17. The computer readable storage medium of claim 13, wherein the at least one hardware resource metric includes at least one of an average input/output queue length, an average transaction latency, an average amount of usage of processing units, an average amount of allocated memory, and an average amount of usage of storage space.

* * * * *